US009764973B2

(12) United States Patent
Larsen et al.

(10) Patent No.: US 9,764,973 B2
(45) Date of Patent: Sep. 19, 2017

(54) WASTEWATER TREATMENT SYSTEM

(71) Applicant: Evoqua Water Technologies LLC, Warrendale, PA (US)

(72) Inventors: Thomas J Larsen, Waukesha, WI (US); Mark Pamperin, Waukesha, WI (US); John Hartwick, Wauwatosa, WI (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 175 days.

(21) Appl. No.: 14/505,583

(22) Filed: Oct. 3, 2014

(65) Prior Publication Data
US 2016/0096754 A1 Apr. 7, 2016

(51) Int. Cl.
*C02F 3/30* (2006.01)
*C02F 3/12* (2006.01)
C02F 101/16 (2006.01)

(52) U.S. Cl.
CPC ............... *C02F 3/30* (2013.01); *C02F 3/302* (2013.01); *C02F 2101/163* (2013.01); *C02F 2101/166* (2013.01)

(58) Field of Classification Search
CPC ........ C02F 3/1257; C02F 3/301; C02F 3/302; C02F 3/308; C02F 3/30; Y10S 210/926; Y10S 210/906
USPC ........................................ 210/605, 926, 194
See application file for complete search history.

(56) References Cited

U.S. PATENT DOCUMENTS

| | | | |
|---|---|---|---|
| 4,452,700 A * | 6/1984 | Schneider | C02F 3/006 210/621 |
| 4,961,854 A | 10/1990 | Wittmann et al. | |
| 4,975,197 A | 12/1990 | Wittmann et al. | |
| 5,118,415 A | 6/1992 | Weis et al. | |
| 5,275,722 A | 1/1994 | Beard | |
| 5,582,734 A | 12/1996 | Coleman et al. | |
| 6,254,778 B1 | 7/2001 | Chudoba et al. | |
| 6,592,762 B2 | 7/2003 | Smith | |
| 7,429,328 B2 | 9/2008 | Miklos | |
| 7,442,298 B2 | 10/2008 | Ling | |
| 7,850,850 B2 | 12/2010 | Miklos | |
| 7,854,842 B2 | 12/2010 | Miklos | |
| 8,002,986 B2 | 8/2011 | Miklos | |
| 8,062,524 B2 | 11/2011 | Ling | |
| 8,236,174 B2 | 8/2012 | Durda et al. | |

(Continued)

FOREIGN PATENT DOCUMENTS

| | | |
|---|---|---|
| WO | 2013049046 A1 | 4/2013 |
| WO | 2013074929 A1 | 5/2013 |

OTHER PUBLICATIONS

Daigger et al., "Mechanism for simultaneous nitrification/denitrification and biological phosphorus removal in Orbal oxidation ditches and their full-scale application." 21st Century Perspective of Water Supply and Sewerage. Water Industries Conference, Hong Kong (1999), pp. 1-10.

(Continued)

*Primary Examiner* — Claire Norris

(57) ABSTRACT

A system and method for treating wastewater includes two or more biological reaction zones separated by chamber walls. The system and method for treating wastewater includes static recycle of a mixed liquor from a second biological reaction zone to a first biological reaction zone.

19 Claims, 5 Drawing Sheets

(56) References Cited

U.S. PATENT DOCUMENTS

| | | | |
|---|---|---|---|
| 8,318,016 B1 * | 11/2012 | Leland | C02F 3/006 |
| | | | 210/138 |
| 8,454,830 B2 | 6/2013 | Miklos | |
| 8,845,900 B2 | 9/2014 | Miklos | |
| 2008/0277340 A1 * | 11/2008 | Hong | B01D 61/22 |
| | | | 210/620 |
| 2012/0175302 A1 | 7/2012 | Miklos | |
| 2013/0256225 A1 | 10/2013 | Leland | |

OTHER PUBLICATIONS

Steffen et al., "Aerated-anoxic oxidation ditch results in enhanced nutrient removal and energy efficiency in the Chesapeake watershed," NC AWWA-WEA Annual Conference, Concord, NC (2011), 8 pages.

"The Orbal® System for Biological Treatment," Siemens Water Technologies, www.siemens.com/water (2008), 10 pages.

* cited by examiner

WASTEWATER TREATMENT SYSTEM

FIELD OF TECHNOLOGY

Aspects and embodiments of the present disclosure are directed generally to systems and methods for the treatment of wastewater. In some embodiments, the wastewater treatment includes static recycle of a mixed liquor responsive to the measurement of a nitrogen species.

SUMMARY

In accordance with an aspect of the present disclosure there is provided a method of treating wastewater. The method comprises introducing wastewater into a first moving biological reaction zone having an activated sludge at a first velocity to form a mixed liquor, allowing the first mixed liquor to flow into a second moving biological reaction zone to form a second mixed liquor having a second velocity, and statically redirecting a portion of the second mixed liquor from the second biological reaction zone to the first biological reaction zone.

In accordance with an aspect of the present disclosure, there is provided a method of recycling mixed liquor in an oxidation ditch having multiple adjacent moving biological reaction zones, the biological reaction zones sharing a common intermediate chamber wall, wherein the mixed liquor level of an outer biological reaction zone is higher than the mixed liquor level of an inner biological reaction zone such that the mixed liquor flows from the outer biological reaction zone to the inner biological reaction zone, comprising statically redirecting the flow of the mixed liquor in the inner biological reaction zone to the outer biological reaction zone at a fluid velocity of two to four times an influent flow rate to the outer biological reaction zone.

In accordance with an aspect of the present disclosure, there is provided a method for retrofitting an oxidation ditch having multiple adjacent moving biological reaction zones, the biological reaction zones sharing a common intermediate chamber wall, comprising positioning at least one opening in the common intermediate chamber wall and positioning a baffle along the common intermediate chamber wall and adjacent to the opening to statically recycle the mixed liquor from an inner biological reaction zone to an outer biological reaction zone through the opening at a rate of two to four times an influent flow rate to the outer biological reaction zone.

In accordance with an aspect of the present disclosure, there is provided a wastewater treatment system comprising multiple adjacent biological reaction zones, the biological reaction zone sharing a common intermediate chamber wall having at least one opening and a baffle secured to the common intermediate chamber wall adjacent the opening at an angle to the common intermediate chamber wall, projecting into an inner zone of an inner biological reaction zone.

In accordance with an aspect of the present disclosure, there is provided a wastewater treatment system comprising multiple concentric biological reaction zones sharing a common intermediate chamber wall having at least one opening, an influent stream fluidly connected to a wastewater source and an outer biological reaction zone of the wastewater treatment system, a baffle secured to the common intermediate chamber wall, projecting into an inner portion of an inner biological reaction zone, and an effluent stream fluidly connected to an inner biological reaction zone and a downstream point.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawing.

DETAILED DESCRIPTION

Figure 1:
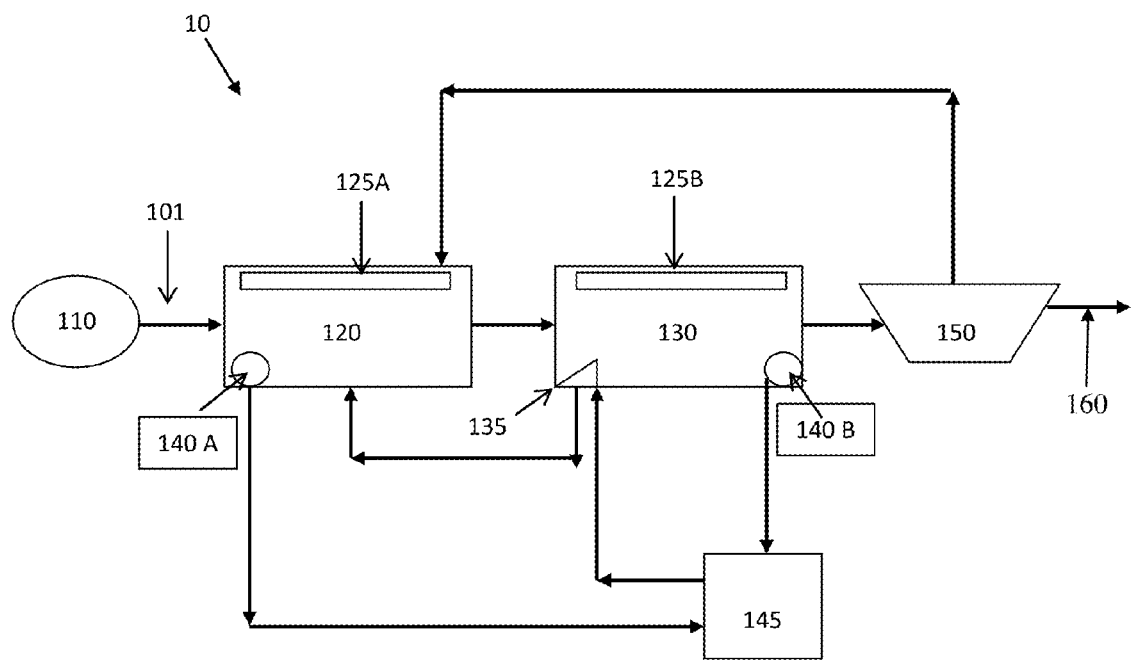
FIG. 1 is a flow diagram illustrating a representative wastewater treatment system pertinent to one or more aspects of the disclosure.

This invention is directed to systems and methods of treating water or wastewater to, for example, reduce nitrogen species concentration, and render the water suitable for secondary uses or discharge to the environment. One or more aspects of the invention relate to wastewater treatment systems and methods of operation and facilitating thereof. The invention is not limited in its application to the details of construction and the arrangement of components, systems, or subsystems set forth herein, and is capable of being practiced or of being carried out in various ways.

The presence of nitrogen and phosphorous in wastewater introduced into surface waters are primary causes of cultural eutrophication (i.e., nutrient enrichment due to human activity) in the surface waters. The most recognizable manifestations of this eutrophication are algal blooms that occur during the summer Chronic symptoms of over-enrichment include low dissolved oxygen, fish kills, murky water, and depletion of desirable flora and fauna. In addition, the increase in algae and turbidity increases the need to chlorinate drinking water, which in turn, leads to higher levels of disinfection by-products that have been shown to increase the risk of cancer. Excessive amounts of nutrients can also stimulate the activity of microbes, such as *Pfisteria* which may be harmful to human health.

A significant percentage of all water body impairments are due to nutrient-related causes, for example, nutrients, oxygen depletion, algal growth, ammonia, harmful algal blooms, biological integrity and turbidity. In efforts to reduce the number of nutrient impairments, many point source dischargers have received more stringent effluent limits for nitrogen and phosphorous. Biological nutrient removal systems are utilized to remove total nitrogen and total phosphorous from wastewater through the use of microorganisms under different environmental conditions in the treatment process.

As used herein, the term "wastewater treatment system" is a system, typically a biological treatment system, having a population of microorganisms, including a diversity of types of bacteria, used to decompose biodegradable material. The conversion of pollutants to innocuous compounds is typically facilitated or mediated by the microorganisms as the wastewater is passed through the wastewater treatment system. A biomass of microorganisms typically requires an environment that provides the proper conditions for growth or biological activity.

In accordance with one or more embodiments, the disclosure relates to one or more systems and methods for treating wastewater. The wastewater treatment system may receive wastewater from a community, industrial, or residential source. For example, the wastewater may be delivered from a municipal or other large-scale sewage system. Alternatively, the wastewater may be generated, for example, by food processing or pulp and paper plants. The wastewater may be moved through the system by operations upstream or downstream of the system.

According to one or more embodiments of the disclosure, a wastewater treatment system may include one or more treatment units each having one or more treatment zones. As used herein, the term "treatment zone" is used to denote an individual treatment region, which can be characterized as promoting, effecting, or exhibiting a type of metabolic activity or biological process. Multiple treatment regions or zones may be housed in a single vessel. Alternatively, a treatment region or zone may be housed in a separate vessel, wherein a different treatment is carried out in each separate vessel. The treatment zones may be sized and shaped according to a desired application and to accommodate a volume of wastewater to be treated. For example, hydraulic residence times of various unit operations of the treatment system may depend on factors such as influent flow rate, effluent requirements, concentration of target compounds in the influent stream, temperature, and expected peak variations of any of these factors.

Each treatment zone may contain a fluidizable media to host microorganisms. Each treatment zone may be maintained at different conditions to enhance growth of different microorganisms. Without being bound by any particular theory, different microorganisms may promote different biological processes. For example, passing wastewater through denitrifying bacteria may increase the efficiency of a denitrifying process. Likewise, passing wastewater through nitrifying bacteria may increase the efficiency of a nitrifying process.

One or more aspects of the present disclosure involve embodiments directed to the removal of or for the reduction of the level of one or more contaminants from wastewater. One or more aspects of the disclosure relate to wastewater treatment systems and methods of operation and methods of modification thereof.

Typically, water to be treated, such as wastewater or a wastewater stream, contains waste matter that, in some instances, can comprise solids and soluble and insoluble organic and inorganic material. Prior to discharge to the environment, such streams may require treatment to decontaminate or at least partially render the wastewater streams benign or at least satisfactory for discharge under established regulatory requirements or guidelines. For example, the water can be treated to reduce its nitrogen content to within acceptable limits.

One of the types of contaminants removed from wastewater in various aspects and embodiments of the present disclosure includes nitrogen species. The removal of nitrogen species from wastewater may involve the removal of total nitrogen compounds that comprise ammonia, nitrate, particulate organic nitrogen, and/or soluble organic nitrogen. The removal process may involve nitrification and denitrification processes.

Nitrification is a microbial process by which ammonia is sequentially oxidized to nitrite and then to nitrate. The nitrification process is accomplished primarily by two groups of autotrophic nitrifying bacteria that can build organic molecules by using energy obtained from inorganic sources, for example, ammonia or nitrite.

Once introduced into the aquatic environment, nitrogen can exist in many forms: dissolved nitrogen gas ($N_2$), ammonia ($NH_4^+$ and $NH_3$), nitrite ($NO_2^-$), nitrate ($NO_3^-$), and organic nitrogen as proteinaceous matter or in dissolved or particulate phases.

In the first step of nitrification, ammonia-oxidizing bacteria oxidize ammonia to nitrite by the equation:

$$NH_3 + O_2 \rightarrow NO_2^- + 3H^+ + 2e^-$$

*Nitrosomas* is the most frequently identified genus associated with this step, although other genera including *Nitrosococcus* and *Nitrosospira* may be involved. The subgenera *Nitrosolobus* and *Nitrosovibrao* can also autotrophically oxidize ammonia.

In the second step of the process, nitrite-oxidizing bacteria oxidize nitrite to nitrate according to the equation:

$$NO_2^- + H_2O \rightarrow NO_3^- + 2H^+ + 2e^-$$

*Nitrobacter* is the genus most frequently associated with this second step, although other genera such as *Nitrospina*, *Nitrococcus* and *Nitrospira* can also autotrophically oxidize nitrite.

Denitrification is the process by which nitrates are reduced to gaseous nitrogen by facultative anaerobes. Facultative anaerobes, such as fungi, can flourish in anoxic conditions because they have the ability to break down oxygen-containing compounds such as nitrate to obtain oxygen. The energy reactions associated with denitrification using methanol as a source of carbon are:

$$6NO_3^- + 2CH_3OH \rightarrow 6NO_2^- + CO_2 + 4H_2O \quad \text{Step 1}$$

$$6NO_2^- + 3CH_3OH \rightarrow 3N_2 + 3CO_2 + 3H_2O + 6OH^- \quad \text{Step 2}$$

$$6NO_3^- + 5CH_3OH \rightarrow 5CO_2 + 3N_2 + 7H_2O + 6OH^- \quad \text{Overall}$$

The organisms carrying out this process are called denitrifiers. In general, they are heterotrophic bacteria that metabolize readily biodegradable substrate under anoxic conditions using nitrate as the electron acceptor. If oxygen is available, these bacteria will metabolize the oxygen before the nitrate. Therefore, the concentration of dissolved oxygen should be maintained at a low level for the denitrification process to function efficiently. Oxygen is typically minimized by avoiding or limiting aeration of the wastewater and by maintaining a high concentration of biological oxygen demand (BOD) so that the microorganisms use all the oxygen.

In one embodiment, nitrate or ammonia concentration in effluent from a wastewater treatment system is measured inline.

One or more of the embodiments disclosed herein may comprise one or more biological treatment units. As used herein, the terms "biological treatment unit" and "biological reaction zone" refer to a reactor where a biological treatment process takes place. In certain embodiments, the biological treatment unit is at least one biological reactor selected from the group consisting of an anaerobic reactor, an anoxic reactor, and an aerobic reactor.

In certain embodiments, effluent from the primary separator may be introduced to an aerated anoxic biological treatment unit. As used herein, the terms "aerated anoxic biological treatment unit," "aerated anoxic biological reaction zone," "aerated anoxic reactor," and "anoxic reactor" refer to a biological reactor where a constant oxygen deficit condition is maintained and the overall oxygen delivery is less than the overall oxygen demand. The wastewater and/or sludge in the anoxic reactor may be aerated and mixed for a period of time using diffusers or aerators. In certain aspects, the anoxic reactor functions as a nitrification/denitrification reactor, where ammonia and/or nitrate-nitrogen present in the influent is converted to elemental nitrogen. While oxygen may be present in a form that is combined with nitrogen, there may be no significant amount of dissolved oxygen present in the anoxic reactor. In certain aspects, optimal denitrification may require that the overall oxygen delivery not only be less than the demand, but must also be less than the demand minus the oxygen recovered through denitrification. The environmental conditions in the anoxic reactor may maintain dissolved oxygen (DO) concentrations at less than about 0.2 milligrams per liter (mg/L). The effluent or wastewater being treated may be held within the anoxic reactor for a designated period of time. The anoxic reactor may serve to denitrify, or reduce the nitrate and nitrite levels of the wastewater. This may be accomplished because the microorganisms are continuing to seek oxygen and the lack of oxygen in a dissolved form forces them to reduce the nitrate and nitrite compounds to nitrogen gas. This leaves nitrogen in a stable gaseous form ($N_2$) and consequently permits it to escape the liquid surface.

In further embodiments, anoxically treated mixed liquor formed in the aerated anoxic biological treatment unit may be introduced into another biological treatment unit. The biological treatment unit can be aerated anoxic, aerobic, or anaerobic, for example. In some embodiments, the biological treatment unit may be an aerobic treatment unit. The term "aerobic" as used herein refers, in general, to the presence of oxygen at a level sufficient to promote the growth and/or metabolic activity of aerobic bacteria. The aerobic bacteria may, for example, facilitate and/or enhance the efficiency of a nitrifying process. The aerobic bacteria may also, for example, facilitate and/or enhance the efficiency of a phosphorus uptake process in which soluble phosphorous is restored to the bacteria. It has been found that an oxygen level of about 1.0 mg/l is sufficient. In some embodiments, the oxygen level is greater than 2.0 mg/L. The aerobic treatment unit may be maintained under aerobic conditions. In at least one embodiment, the anoxically treated liquid may be treated in the aerobic treatment unit to form an aerobically treated mixed liquor. In some embodiments, conditions may be provided or maintained in the aerobic treatment unit so that at least a portion of the anoxically treated liquid is formed into aerobically treated liquid. In a further embodiment, an aerobically treated sludge may be separated from the aerobically treated liquid. In certain instances, a portion of the sludge may be introduced to the aerated anoxic biological treatment unit as a source of carbon. In yet a further embodiment, the aerobically treated liquid may be introduced into a secondary separator. In some cases, solids may be removed from the aerobically treated liquid in the secondary separator. A portion of the removed solids may be reintroduced into the aerated anoxic biological treatment unit.

In various embodiments, the wastewater treatment system may comprise an anaerobic treatment unit. The anaerobic treatment unit may be maintained under anaerobic conditions to promote the growth and/or metabolic activity of anaerobic bacteria. The term "anaerobic conditions," as used herein, refers to an absence of oxygen. The anaerobic bacteria may, for example, facilitate and/or enhance the efficiency of a phosphorous release process in which the bacteria may take up volatile fatty acids through a mechanism involving hydrolysis and release of phosphate.

In some embodiments, the wastewater treatment system may statically redirect flow from a biological reaction zone with a lower mixed liquor level to a biological reaction zone with a higher mixed liquor level. "Statically redirecting," as referred to herein, means redirecting a flow without energy input. Statically redirecting the flow increases the residence time of the mixed liquor, and decreases the nitrogen species concentration in the mixed liquors.

Typically, such recycle is achieved with the use of pumps, which increases energy input, and therefore increases capital and operating costs. In some embodiments, the wastewater treatment system may comprise a baffle. The systems and components of the invention may provide cost advantages relative to other wastewater treatment systems that perform recycling. The systems and components of the invention may provide lower operating costs and lower capital costs than those wastewater treatment systems employing one or more pumps for recycling.

In some embodiments, openings in the structural compartments of the biological treatment zones may be provided to recycle the flow of a mixed liquor. The flow recycle can be directed by the use of a baffle. The baffle can be positioned and sized to optimize the flow. In some embodiments, baffles, and the opening through which the baffles redirect flow, are sized and shaped to redirect flow from an anaerobic biological treatment zone to an aerated anoxic biological treatment zone at a predetermined rate to optimize, for example, a nitrification-denitrification process by increasing the residence time in the aerated anoxic biological treatment zone. It has been observed that a flow rate of two to four times an influent flow rate to the aerated anoxic biological treatment zone is sufficient. Outside of this range, the recycle flow rate is not efficient. For example, a recycle flow rate less than two times the influent flow rate to the aerated anoxic biological treatment zone may not be effective at reducing the overall nitrogen species concentration, and a recycle flow rate more than four times the influent flow rate to the aerated anoxic biological treatment zone may provide less significant nitrogen species concentration reduction over the desired recycle flow rate.

Process control systems are used in wastewater treatment systems. Typically, the control systems instruct a pump to recycle mixed liquor from a second biological treatment zone to a first biological treatment zone. According to one or more embodiments, the wastewater treatment system may comprise a control system. The control system may instruct a pump to recycle mixed liquor from a second biological treatment zone to a first biological treatment zone based on, for example, the flow rate into the system, the flow rate between units, the pH of the mixed liquor, the temperature of the mixed liquor, the oxidation reduction potential of the mixed liquor or the concentration of a particular species, such as nitrogen. The control system may strategically adjust the angle of a baffle within the system to facilitate pollutant removal. The angle of the baffle can influence the recycle flow rate. For example, the baffle can be angled such that the recycle flow rate is two to four times the influent flow rate. In some embodiments, the controller can also control a pump to recycle mixed liquor from a second biological treatment zone to a first biological treatment zone. The energy required of the pump in a system comprising a baffle will be lower than the energy required of a pump in a typical wastewater treatment system not comprising a baffle. Strategic management of the recycle flow rate may lead to overall improved biological removal of pollutants.

The control system may comprise one or more sensors. Non-limiting examples of sensors suitable for use in the methods and systems described herein may include DO galvanic probes, DO optical probes, ORP probes, ammonia concentration probes or sensors, nitrate concentration probes or sensors, or any sensor capable of detecting the concentration of nitrate and/or ammonia present at any point within the treatment system, as well as or any other sensor that measures process conditions. The sensor may be positioned, for example, so as to determine the concentration of nitrate and/or ammonia with the aerobic biological reaction zone. In certain embodiments, the sensors may detect or measure a process parameter and report the value to the control system. The control system may be configured to compare the detected or measured value with a target value. Responsive to a result of the comparison, the control system may be configured to select a baffle angle.

In certain embodiments, the wastewater treatment system may further comprise a measurement system. The measurement system may be in communication with the control system. In some embodiments, the measurement system may function as one or more components of a control system. The measurement system may be in communication with one or more sensors in the treatment system, as previously discussed. In various embodiments, the measurement system may be configured to measure one or more process parameters. For example, the measurement system may be configured to measure a level of nitrogen species in the biological treatment unit.

Some embodiments of the treatment systems of the invention can comprise a system capable of breaking down and/or converting various materials into other, more useful end products.

Some other embodiments of the treatment system can comprise one or more systems capable of separation processes. The separation processes may separate certain portions of water to be treated or sludge. The separation processes may be capable of removing large materials from the wastewater, for example, grit, sand, and gravel. Other separations processes can remove large insoluble material of the water to be treated such as, but not limited to fats, oils, and grease. Other separation systems may take advantage of the settling characteristics of materials, such as settleable solids and floating bodies. Various separations may employ unit operations such as settling tanks, clarifiers, thickeners, and filtration systems.

FIG. 1 illustrates a wastewater treatment system 10 in accordance with one or more embodiments of the present disclosure. In accordance with any one of the aforementioned aspects of the invention, treatment system 10 may comprise one or more treatment unit operations, which may include one or more biological reaction processes and one or more solids-reducing and solids-collecting systems or processes.

Source 110 of water to be treated can be a water collection system from any one or more of a municipality, a residential community, and an industrial or a commercial facility, and an upstream pre-treatment system, or combinations thereof. For example, source 110 may be a screen, or settling tank receiving water from a sewer system.

The wastewater treatment system includes a source 110 of water fluidly connected through conduit 101 to a first biological reaction zone 120 having an activated sludge to form a first mixed liquor. Depending on the desired effluent, first biological reaction zone 120 may be any of aerated anoxic, aerobic, and anaerobic. In an embodiment, first biological reaction zone 120 may be an aerated anoxic zone including an aerator 125A. Aerator 125A may be any aerator to provide dissolved oxygen sufficient to maintain anoxic conditions and to contribute to the movement of the contents of the first biological reaction zone 120 if desired. In some embodiments, aerator 125A is a disc aerator. Aerator 125A may operate at a desired flow velocity sufficient to maintain solids in suspension in the first mixed liquor without negatively affecting the microorganisms in first biological reaction zone 120. Aerator 125A may further operate at a desired flow velocity to maintain homogeneity of the first mixed liquor. In one embodiment, it has been observed that a flow velocity of one to four feet per second is sufficient. In some embodiments, the flow velocity may be up to four feet per second. In preferred embodiments, the flow velocity may be up to three feet per second.

First biological reaction zone 120 may include a sensor 140A, or a plurality of such sensors, which is configured to measure a quality of the first mixed liquor. Sensor 140A may measure, for example, the velocity, pH, temperature, oxidation reduction potential or species concentration in the first mixed liquor. Sensor 140A may measure the concentration of nitrate and/or ammonia in the first mixed liquor, for example, wastewater in the first biological reaction zone. Sensor 140A is illustrated in FIG. 1 as being disposed within first biological reaction zone 120, however, in other embodiments sensor 140A (or an additional nitrogen species concentration sensor) may be provided on an effluent outlet of second biological reaction zone 130, for example. In some embodiments it is desirable to position sensor 140A at a location in first biological reaction zone 120 where there is significant mixing of the contents of first biological reaction zone 120 to provide a representative measurement of the conditions within first biological reaction zone 120 as a whole.

The first mixed liquor may be allowed to flow from first biological reaction zone 120 to the second biological reaction zone 130 after some residence time to form a second mixed liquor. Depending on the desired effluent, second biological reaction zone 130 may be any of aerated anoxic, aerobic, and anaerobic. In an embodiment, second biological reaction zone 130 may be an aerobic zone including an aerator 125B. Aerator 125B may be any aerator to provide dissolved oxygen sufficient to maintain anoxic conditions and to contribute to the movement of the contents of the first biological reaction zone 120 if desired. In some embodiments, aerator 125B is a disc aerator. Aerator 125B may operate at a desired flow velocity sufficient to maintain solids in suspension in the first mixed liquor without negatively affecting the microorganisms in first biological reaction zone 130. Aerator 125B may further operate at a desired flow velocity to maintain homogeneity of the first mixed liquor. In one embodiment, it has been found that a flow velocity of one to four feet per second is sufficient. In some embodiments, the flow velocity may be up to ten feet per second. In preferred embodiments, the flow velocity may be up to five feet per second.

A portion of the second mixed liquor may be statically redirected from second biological reaction zone 130 to first biological reaction zone 120 by way of a baffle 135 and an opening in the wall. The wastewater treatment system may include more than one baffle 135. The recycle flow rate may be a predetermined flow rate sufficient to optimize, for example, a nitrification-denitrification process by increasing the residence time in first biological reaction zone 120. In one embodiment, it has been observed that a flow rate of two to four times an influent flow rate to first biological reaction zone 120 is sufficient. Outside of this range, the recycle flow rate is not efficient. For example, a recycle flow rate less than two times the influent flow rate to the aerated anoxic biological treatment zone may not be effective at reducing the overall nitrogen species concentration, and a recycle flow rate more than four times the influent flow rate to first biological reaction zone 120 may provide less significant nitrogen species concentration reduction over the desired recycle flow rate.

Second biological reaction zone 130 may include a sensor 140B, or a plurality of such sensors, which is configured to measure a quality of the second mixed liquor. Sensor 140B may measure, for example, the velocity, pH, temperature, oxidation reduction potential or species concentration in the second mixed liquor. Sensor 140B may measure the concentration of nitrate and/or ammonia in the second mixed liquor, for example, wastewater in the second biological reaction zone and/or effluent from the second biological reaction zone. Sensor 140B is illustrated in FIG. 1 as being disposed within the second biological reaction zone 130, however, in other embodiments sensor 140B (or an additional sensor) may be provided on an effluent outlet of the second biological reaction zone 130, for example. In some embodiments it is desirable to position sensor 140B at a location in second biological reaction zone 130 where there is significant mixing of the contents of second biological reaction zone 130 to provide a representative measurement of the conditions within second biological reaction zone 130 as a whole.

A portion of the second mixed liquor may be directed from second biological reaction zone 130 to a settling unit 150. An effluent stream 160 may be withdrawn from the second mixed liquor in settling unit 150. A portion of the effluent stream may be recycled to first biological reaction zone 120 for further processing. A portion of effluent stream 160 may be directed to a downstream unit. Activated sludge may be withdrawn from the second mixed liquor in settling unit 150 to form a settled sludge. A portion of the settled sludge can be recycled to first biological reaction zone 120.

A portion of the second mixed liquor may be allowed to flow to a third biological reaction zone to form a third mixed liquor. The third biological reaction zone may be one of aerated anoxic, aerobic, and anaerobic. In an embodiment, the third biological reaction zone may be an aerobic zone including an aerator. The aerator may be any aerator to provide dissolved oxygen sufficient to maintain aerobic conditions and to contribute to the movement of the contents of the third biological reaction zone if desired. In some embodiments, the aerator is a disc aerator. The aerator may operate at a desired flow velocity sufficient to maintain solids in suspension in the first mixed liquor without negatively affecting the microorganisms in the third biological reaction zone. The aerator may further operate at a desired flow velocity to maintain homogeneity of the first mixed liquor. In one embodiment, it has been observed that a flow velocity of one to four feet per second is sufficient. In preferred embodiments, the flow velocity may be up to four feet per second.

The third biological reaction zone may include a baffle. The third biological reaction zone may include more than one baffle. The third mixed liquor may be statically redirected to second biological reaction zone 130. The recycle flow rate can be a predetermined flow rate sufficient to optimize, for example, a nitrification-denitrification process by increasing the residence time in second biological reaction zone 130. In one embodiment, it has been observed that a flow rate of two to four times an influent flow rate to first biological reaction zone 120 is sufficient. Outside of this range, the recycle flow rate is not efficient. For example, a recycle flow rate less than two times the influent flow rate to the aerated anoxic biological treatment zone may not be effective at reducing the overall nitrogen species concentration, and a recycle flow rate more than four times the influent flow rate to first biological reaction zone 120 may provide less significant nitrogen species concentration reduction over the desired recycle flow rate.

Sensors 140A and 140B may be ammonia concentration sensors and/or a nitrate concentration sensors, for example, any one of the ammonia and/or nitrate sensors available from the Hach Company, Loveland, Colo. Sensors 140A and 140B may communicate, electrically or otherwise, with a controller 145 to provide the controller with a signal corresponding to a concentration of ammonia and/or nitrate in second biological reaction zone 130. Controller 145 may control the angle of a baffle 135 disposed within second biological reaction zone 130. Controller 145 may control a pump to recycle mixed liquor from one biological reaction zone to another biological reaction zone.

In different embodiments, controller 145 for monitoring electrical parameters from one or more sensors, for example, sensor 140A, and for controlling one or more portions of the wastewater treatment system, for example, baffle 135 may be embodied in any of numerous forms. In one example, a computerized controller for embodiments of the system disclosed herein is implemented using one or more computer systems. The computer system may be, for example, a general-purpose computer such as those based on a standard processor or combinations thereof. Alternatively, the computer system may include specially-programmed, special-purpose hardware, for example, an application-specific integrated circuit (ASIC) or controllers intended specifically for wastewater treatment equipment.

The computer system may include one or more processors typically connected to one or more memory devices, which may comprise, for example, any one or more of a disk drive memory, a flash memory device, a RAM memory device, or other device for storing data. The memory is typically used for storing programs and data during operation of the system. For example, the memory may be used for storing historical data relating to the parameters over a period of time, as well as operating data. Software, including programming code that implements embodiments of the invention, may be stored on a computer readable and/or writable nonvolatile recording medium, and then typically copied into memory wherein it can then be executed by one or more processors. Such programming code may be written in any of a plurality of programming languages, for example, Java, or Visual Basic.

Components of the computer system may be coupled by one or more interconnection mechanisms, which may include one or more busses, e.g., between components that reside on separate discrete devices. The interconnection mechanism typically enables communications, e.g., data, instructions, to be exchanged between components of the system.

The computer system may also include one or more input devices, for example, a keyboard, mouse, trackball, microphone, touch screen, and other man-machine interface devices as well as one or more output devices, for example, a printing device, display screen, or speaker. In addition, the computer system may contain one or more interfaces that may connect the computer system to a communication network, in addition or as an alternative to the network that may be formed by one or more of the components of the system.

Figure 2:
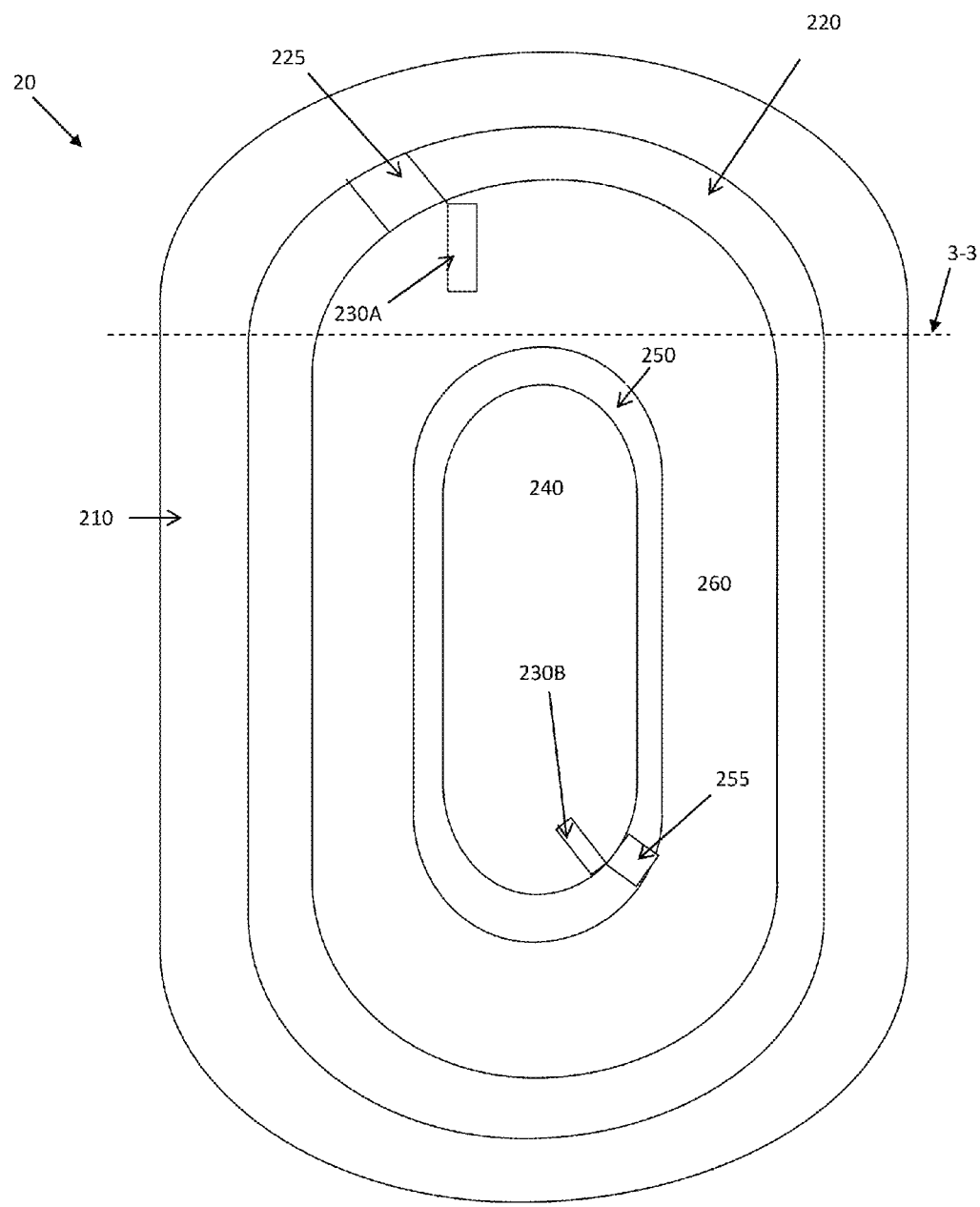
FIG. 2 is a schematic diagram illustrating a representative wastewater treatment system pertinent to one or more aspects of the disclosure.

In some embodiments, for example, as illustrated in FIG. 2, the biological reaction zones are separated by common intermediate chamber walls. For example, first biological reaction zone 210 and second biological reaction zone 260 may be separated by first common intermediate chamber wall 220. First common intermediate chamber wall 220 may be higher than the first mixed liquor level and the second mixed liquor level. First common intermediate chamber wall 220 may be ten feet high, for example. The first mixed liquor level in first biological reaction zone 210 may be higher than the second mixed liquor level in second biological reaction zone 260. First common intermediate chamber wall 220 may have at least one first outlet to allow the first mixed liquor in first biological reaction zone 210 to flow to second biological reaction zone 260 after some residence time. Second common intermediate chamber wall 250 may have at least one outlet to allow the second mixed liquor in second biological reaction zone 260 to flow to third biological reaction zone 240. In some embodiments the biological reaction zones are concentric. In some embodiments the biological reaction zones are in a racetrack configuration.

First baffle 230A may be secured to first common intermediate chamber wall 220 adjacent to a first opening 225. First baffle 230A may project into the second biological reaction zone 260. First baffle 230A may assist the transfer of flow from second biological reaction zone 230 to first biological reaction zone 210 through first opening 225. First baffle 230A may take advantage of the movement of the second mixed liquor to redirect the second mixed liquor to first biological reaction zone 210. First baffle 230A may be placed at a predetermined position along first intermediate chamber wall 220 to optimize transfer of flow of the second mixed liquor. Relative to the wall, the angle of the baffle may be any angle that will take advantage of the flow. In some embodiments, the angle can be 90° or less. Preferably, the angle is 45°. First opening 225 may take advantage of centrifugal force and the movement of the second mixed liquor to redirect the second mixed liquor to first biological reaction zone 210. First opening 225 may be placed at a predetermined position along first intermediate chamber wall 220 to optimize transfer of flow of the second mixed liquor. In some embodiments, first opening 225 may be placed along first intermediate chamber wall 220 at a 45° angle to the center of the wastewater treatment system.

First baffle 230A and first opening 225 may be sized and shaped to optimize recycle flow rates. For example, first baffle 230A and first opening 225 may be sized and shaped to recycle mixed liquor at a predetermined flow rate sufficient to optimize, for example, a nitrification-denitrification process by increasing residence time in first biological reaction zone 210. In one embodiment, it has been observed that a recycle flow rate of two to four times the flow rate of the influent is sufficient. Outside of this range, the recycle flow rate is not efficient. For example, a recycle flow rate less than two times the influent flow rate to the aerated anoxic biological treatment zone may not be effective at reducing the overall nitrogen species concentration, and a recycle flow rate more than four times the influent flow rate to the aerated anoxic biological treatment zone may provide less significant additional nitrogen species concentration reduction over the desired recycle flow rate.

Second baffle 230B may be secured to second common intermediate chamber wall 250 adjacent to a first opening 255. Second baffle 230B may project into third biological reaction zone 240. Second baffle 230B may assist the transfer of flow from third biological reaction zone 240 to second biological reaction zone 260 through second opening 255. Second baffle 230B may take advantage of the movement of the second mixed liquor to redirect the third mixed liquor to second biological reaction zone 260. Second baffle 230B may be placed at a predetermined position along second intermediate chamber wall 250 to optimize transfer of flow of the third mixed liquor. Relative to the wall, the angle of the baffle may be any angle that will take advantage of the flow. In some embodiments, the angle may be 90° or less. Preferably, the angle is 45°. Second opening 255 may take advantage of centrifugal force and the movement of the third mixed liquor to redirect the third mixed liquor to second biological reaction zone 260. Second opening 255 may be placed at a predetermined position along second intermediate chamber wall 250 to optimize transfer of flow of the third mixed liquor. In some embodiments, second opening 255 may be placed along second intermediate chamber wall 250 at a 45° angle to the center of the wastewater treatment system.

Second baffle 230B and second opening 255 may be sized and shaped to optimize recycle flow rates. For example, second baffle 230B and second opening 255 may be sized and shaped to recycle mixed liquor at a predetermined flow rate sufficient to optimize, for example, a nitrification-denitrification process by increasing residence time in second biological reaction zone 260. In some embodiments, it has been observed that a recycle flow rate of two to four times the flow rate of the influent is sufficient. Outside of this range, the recycle flow rate is not efficient. For example, a recycle flow rate less than two times the influent flow rate to the aerated anoxic biological treatment zone may not be effective at reducing the overall nitrogen species concentration, and a recycle flow rate more than four times the influent flow rate to the aerated anoxic biological treatment zone may provide less significant additional nitrogen species concentration reduction over the desired recycle flow rate.

In some embodiments, a wastewater treatment system 20 may be retrofitted to include a first baffle 230A and a first opening 225. Wastewater treatment system 20 may include at least one first common intermediate chamber wall 220 separating a first biological reaction zone 210 and a second biological reaction zone 260. First common intermediate chamber wall 220 may be higher than the level of the first mixed liquor and the second mixed liquor in order to keep the mixed liquor from flowing over first common intermediate chamber wall 220. First common intermediate chamber wall 220 may be, for example, ten feet high. In some embodiments, the biological reaction zones may be concentric, for example, concentric racetrack or concentric circular. Retrofitting may include positioning at least one opening 225 in the common intermediate chamber wall 220 and positioning a baffle 230A along the common intermediate chamber wall 220 and adjacent to opening 225 to statically recycle a mixed liquor from second biological reaction zone 260 to first biological reaction zone 210. In some embodiments, baffle 230A is positioned at a predetermined location on common intermediate chamber wall 220. First baffle 230A can project into second biological reaction zone 260. First baffle 230A may assist the transfer of flow from second biological reaction zone 230 to first biological reaction zone 210 through first opening 225. First baffle 230A may take advantage of the movement of the second mixed liquor to redirect the second mixed liquor to first biological reaction zone 210. First baffle 230A may be placed at a predetermined position along first intermediate chamber wall 220 to optimize transfer of flow of the second mixed liquor. Relative to the wall, the angle of baffle 230A may be any angle that will take advantage of the flow. In some embodiments, the angle may be 90° or less. Preferably, the angle is 45°. In some embodiments, the angle of baffle 230A may be controlled based on a measured nitrogen content of an effluent stream. First opening 225 may take advantage of centrifugal force and the movement of the second mixed liquor to redirect the second mixed liquor to first biological reaction zone 210. First opening 225 may be placed at a predetermined position along first intermediate chamber wall 220 to optimize transfer of flow of the second mixed liquor. In some embodiments, first opening 225 may be placed along first intermediate chamber wall 220 at a 45° angle to the center of the wastewater treatment system.

First baffle 230A and first opening 225 may be sized and shaped to optimize recycle flow rates. For example, first baffle 230A and first opening 225 may be sized and shaped to recycle mixed liquor at a predetermined flow rate sufficient to optimize, for example, a nitrification-denitrification process by increasing residence time in first biological reaction zone 210. In one embodiment, it has been observed that a recycle flow rate of two to four times the flow rate of the influent is sufficient. Outside of this range, the recycle flow rate is not efficient. For example, a recycle flow rate less than two times the influent flow rate to the aerated anoxic biological treatment zone may not be effective at reducing the overall nitrogen species concentration, and a recycle flow rate more than four times the influent flow rate to the aerated anoxic biological treatment zone may provide less significant additional nitrogen species concentration reduction over the desired recycle flow rate.

Figure 3:
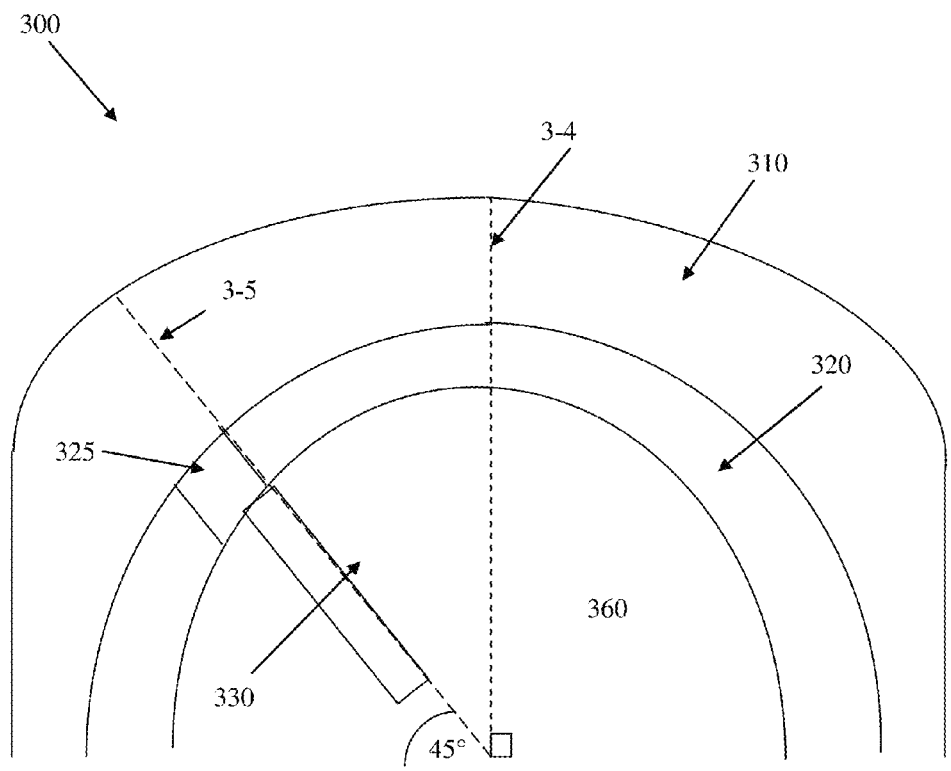
FIG. 3 is a schematic diagram taken along section line 3-3 illustrating a representative wastewater treatment system pertinent to one or more aspects of the disclosure.

FIG. 3 illustrates a representative section of the wastewater treatment system of FIG. 2 taken along section line 3-3. In some embodiments, the biological reaction zones may be separated by common intermediate chamber walls. For example, a first biological reaction zone 310 and a second biological reaction zone 360 may be separated by a first common intermediate chamber wall 320. The first mixed liquor level in first biological reaction zone 310 may be higher than the second mixed liquor level in second biological reaction zone 360. First common intermediate chamber wall 320 may be higher than the level of the first mixed liquor and the second mixed liquor in order to keep the mixed liquor from flowing over first common intermediate chamber wall 320. First common intermediate chamber wall 320 may be, for example, ten feet high. First common intermediate chamber wall 320 may have at least one first outlet to allow the first mixed liquor in the first biological reaction zone 310 to flow to the second biological reaction zone 360 after some residence time. In some embodiments the biological reaction zones are concentric. In some embodiments the biological reaction zones are in a racetrack configuration.

Baffle 330 can be secured to common intermediate chamber wall 320 adjacent to an opening 325 to statically recycle a mixed liquor from second biological reaction zone 360 to first biological reaction zone 310. In some embodiments, a baffle 330 is positioned at a predetermined location on common intermediate chamber wall 320. Baffle 330 may project into second biological reaction zone 360. Baffle 330 may assist the transfer of flow from second biological reaction zone 360 to first biological reaction zone 310 through first opening 325. Baffle 330 may take advantage of the movement of the second mixed liquor to redirect the second mixed liquor to first biological reaction zone 310. Baffle 330 may be placed at a predetermined position along first intermediate chamber wall 320 to optimize transfer of flow of the second mixed liquor. Relative to the wall, the angle of the baffle may be any angle that will take advantage of the flow. In some embodiments, the angle may be 90° or less. Preferably, the angle is 45°. In some embodiments, the angle of baffle 330 may be controlled based on a measured nitrogen content of an effluent stream. First opening 325 may take advantage of centrifugal force and the movement of the second mixed liquor to redirect the second mixed liquor to first biological reaction zone 310. First opening 325 may be placed at a predetermined position along first intermediate chamber wall 320 to optimize transfer of flow of the second mixed liquor. In some embodiments, first opening 325 may be placed along first intermediate chamber wall 320 at a 45° angle to the center of the wastewater treatment system, as is shown in FIG. 3.

Baffle 330 and first opening 325 may be sized and shaped to optimize recycle flow rates. For example, baffle 230 and first opening 325 may be sized and shaped to recycle mixed liquor at a predetermined flow rate sufficient to optimize, for example, a nitrification-denitrification process by increasing residence time in first biological reaction zone 310. In one embodiment, it has been observed that a recycle flow rate of two to four times the flow rate of the influent is sufficient. Outside of this range, the recycle flow rate is not efficient. For example, a recycle flow rate less than two times the influent flow rate to the aerated anoxic biological treatment zone may not be effective at reducing the overall nitrogen species concentration, and a recycle flow rate more than four times the influent flow rate to the aerated anoxic biological treatment zone may provide less significant additional nitrogen species concentration reduction over the desired recycle flow rate.

Figure 4:
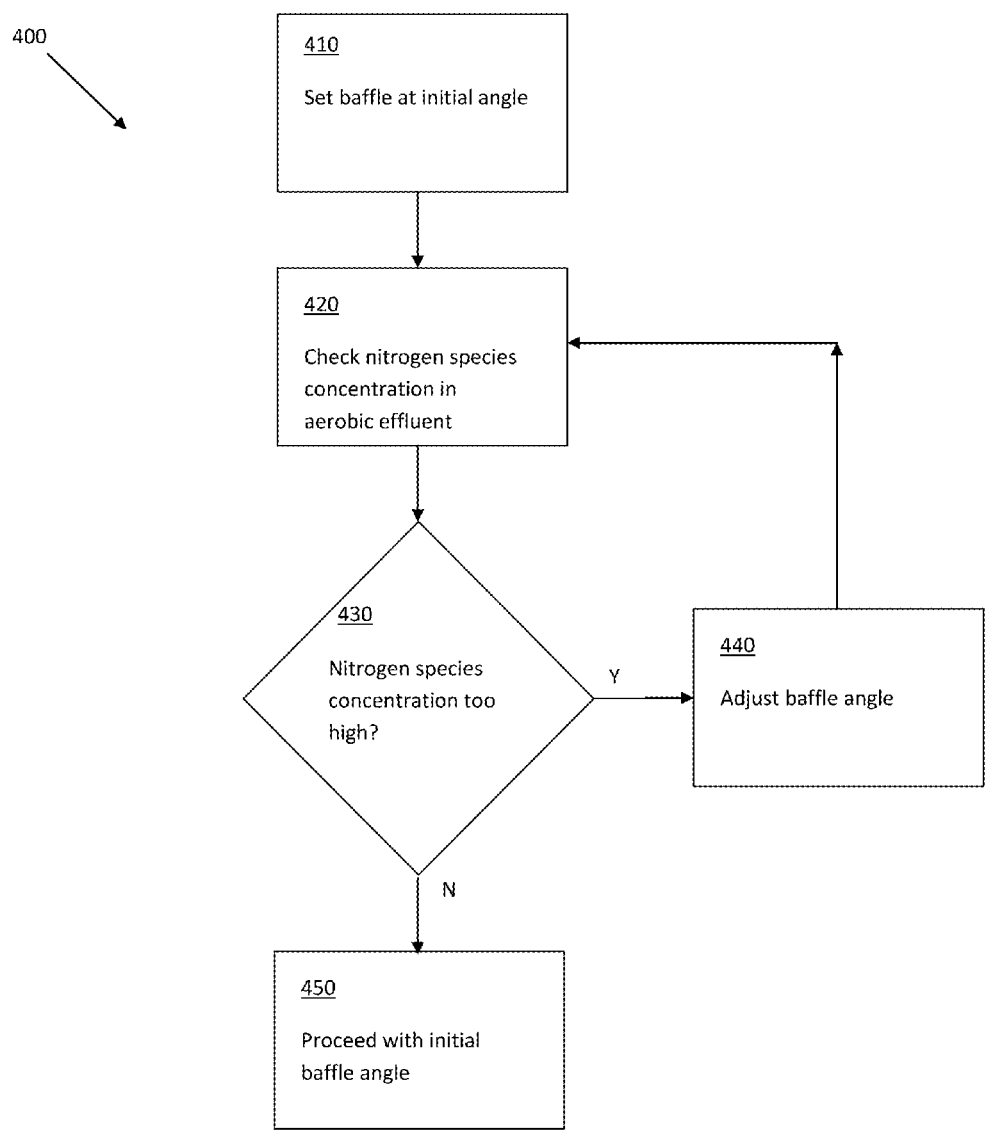
FIG. 4 is flow diagram illustrating a representative control system pertinent to one or more aspects of the disclosure.

In some embodiments, as illustrated in FIG. 4, a control system 400 controls a baffle angle in a wastewater treatment system. During operation, the concentration of nitrogen species in first biological reaction zone 120 may be monitored (act 420) by the sensor 140A and/or controller 145. The measured nitrogen species concentration is compared, for example, by controller 145 to a desired or target concentration (decision 430). If the nitrogen species concentration sensor measures a concentration of nitrogen in first biological reaction zone 120 being different from, for example, exceeding the desired or target concentration, the angle of baffle 135 may be adjusted (act 440). The baffle may be operated at the second angle until the measured nitrogen species concentration returns or drops below the desired or target concentration.

In an alternative embodiment, sensor 140B may be utilized to measure a concentration of a nitrogen species, for example, ammonia or nitrate in second biological reaction zone 130. The measured concentration of the nitrogen species may then be compared, for example, to a desired or target nitrogen species concentration. The desired or target nitrogen species concentration in second biological reaction zone 130 may be selected to satisfy local regulation in a location in which the wastewater treatment system 10 is located. The desired or target nitrogen species concentration may be, for example, less than about 3 mg/L of nitrate. This target concentration is exemplary only and may vary depending upon a desired quality of water produced from the wastewater treatment system which may be determined to meet regulatory requirements of a particular locale in which the wastewater treatment system is operated. The control system of the wastewater treatment system may be calibrated prior to beginning operation or may undergo periodic calibrations.

In accordance with any one of the aforementioned aspects of the invention, treatment system 20 can comprise one or more treatment unit operations, which may include one or more biological reaction processes and one or more solids-reducing and solids-collecting systems or processes.

Treatment system 20 may include a source of water to be treated. The source of water may be a water collection system from any one or more of a municipality, a residential community, and an industrial or a commercial facility, and an upstream pre-treatment system, or combinations thereof. For example, source 110 may be a sedimentation or settling tank receiving water form a sewer system.

Figure 5:
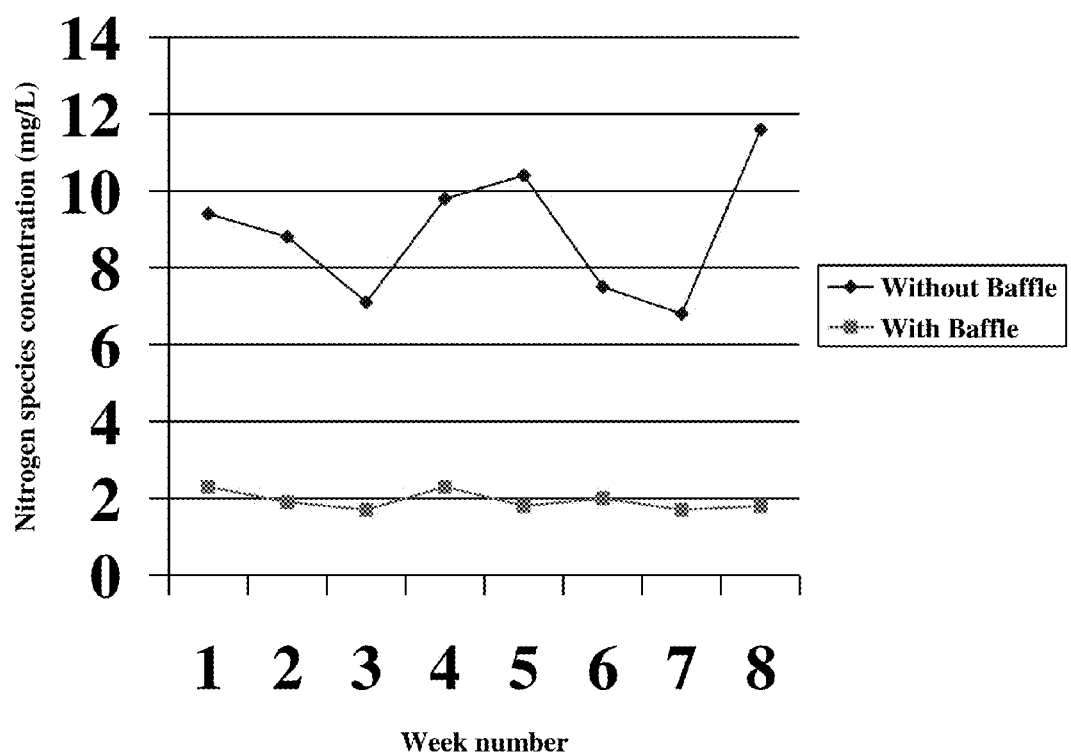
FIG. 5 is a graph of nitrogen species concentration in an effluent for a treatment system pertinent to one or more aspects of the invention.

In some embodiments, as illustrated in FIG. 5, the use of a baffle 135 may significantly reduce the overall nitrogen species in a system effluent. FIG. 5 illustrates the reduction in nitrate plus nitrite concentration in an exemplary.

EXAMPLE

To determine the effectiveness of the invention, samples of effluent from a wastewater treatment system from a common community with and without a passive internal recycle baffle were analyzed over similar periods of time. An Orbal™ wastewater treatment system (Evoqua Water Technologies LLC), including three biological treatment units in series, similar to that schematically shown in FIG. 2, was modified to statically recycle mixed liquor from an inner channel to an outer channel. The size of the treatment system basin was 294,754 gallons total, with the first biological treatment zone having a volume of approximately 166,028 gallons in, the second biological reaction zone having a volume of about 114,326 gallons, and the third biological reaction zone having a volume of about 14,400 gallons. The system flow rate averaged about 0.36 million gallons per day for an overall hydraulic residence time of 16.1 days. The aerated channels were aerated with disc aerators.

Samples of the effluent, as can be seen in FIG. 5, were analyzed once a week for two months for the system without a baffle. The nitrate plus nitrite concentrations read 9.4, 8.8, 7.1, 9.8, 10.4, 7.5, 6.8, and 11.6 mg/L, for an average concentration of 8.9 mg/L. After the baffle and opening were installed in the system, samples of the effluent were analyzed once a week for two months. In this case, the nitrate plus nitrite concentrations read 2.3, 1.9, 1.7, 2.3, 1.8, 2.0, 1.7, and 1.8, for an average concentration of 1.9 mg/L. The samples were taken during similar periods of the year, and the population of the town in which the wastewater treatment system is located did not change substantially. The influent make-up therefore did not vary substantially. As such, the difference in the average nitrate plus nitrite concentration of the samples can be attributed to the modified Orbal™ wastewater treatment system.

The passive internal recycle baffle in the Orbal™ wastewater treatment system successfully redirected mixed liquor from a treatment channel with a lower mixed liquor level to a treatment channel with a higher mixed liquor level at a flow rate of two to four times the influent flow rate, which was high enough significantly reduce the nitrate-nitrite concentration in the mixed liquor by 79%. The passive internal recycle baffle further accomplished this without any extra energy input or operating costs. This system produced unexpected results by moving a mixed liquor against the force of gravity, and at a great enough flow rate to significantly reduce the nitrate-nitrite concentration in the mixed liquor. The system realized significant cost savings in operation, and was able to achieve recycle of a mixed liquor without the use of a pump or added energy.

The methods and systems described herein are not limited in their application to the details of construction and the arrangement of components set forth in the previous description or illustrations in the figures. The methods and systems described herein are capable of other embodiments and of being practices or of being carried out in various ways. Also, the phraseology and terminology used herein is for the purpose of description and should not be regarded as limiting. The use of "including," "comprising," "having," "containing," "involving," "characterized by," "characterized in that," and variations thereof herein is meant to encompass the items listed thereafter, equivalents thereof, as well as alternate embodiments consisting of the items listed thereafter exclusively.

Use of ordinal terms such as "first," "second," "third," and the like in the specification and claims to modify an element does not by itself connote any priority, precedence, or order of one element over another or the temporal order in which acts of a method are performed, but are used merely as labels to distinguish one element having a certain name from another element having a same name, but for use of the ordinal term, to distinguish the elements.

Those skilled in the art would readily appreciate that the various parameters and configurations described herein are meant to be exemplary and that actual parameters and configurations will depend upon the specific application for which the apparatus and methods of the present disclosure are used. Those skilled in the art will recognize, or be able to ascertain using no more than routine experimentation, many equivalents to the specific embodiments described herein. For example, those skilled in the art may recognize that the system, and components thereof, according to the present disclosure may further comprise a network of systems or be a component of a water treatment system. It is, therefore, to be understood that the foregoing embodiments are presented by way of example only and that, within the scope of the appended claims and equivalents thereto, the disclosed systems and methods may be practiced otherwise than as specifically described. The present systems and methods are directed to each individual feature, system, or method described herein. In addition, any combination of two or more such features, systems, or methods, if such features, systems, or methods are not mutually inconsistent, is included within the scope of the present disclosure. The steps of the methods disclosed herein may be performed in the order illustrated or in alternate orders and the methods may include additional or alternative acts or may be performed with one or more of the illustrated acts omitted.

Further, it is to be appreciated that various alterations, modifications, and improvements will readily occur to those skilled in the art. Such alterations, modifications, and improvements are intended to be part of this disclosure, and are intended to be within the spirit and scope of the disclosure. In other instances, an existing facility may be modified to utilize or incorporate any one or more aspects of the methods and systems described herein. Thus, in some instances, the systems may involve connecting or configuring an existing facility to comprise a treatment system or components of a treatment system, for example, using the methods and systems comprising baffles controlled at least in part responsive to nitrogen species concentration measurements in the treatment system as disclosed herein. Accordingly, the foregoing description and figures are by way of example only. Further, the depictions in the figures do not limit the disclosures to the particularly illustrated representations.

While exemplary embodiments of the disclosure have been disclosed, many modifications, additions, and deletions may be made therein without departing from the spirit and scope of the disclosure and its equivalents, as set forth in the following claims.

What is claimed is:

1. A process for treating wastewater, comprising the steps of:
    introducing wastewater at an influent velocity through an inlet into an outer aerated anoxic zone wherein the wastewater undergoes nitrification/denitrification;
    moving an activated sludge and forming a first mixed liquor having a height in the aerated anoxic zone;
    allowing the first mixed liquor to flow into an inner aerobic zone through an outlet;
    forming a second mixed liquor in the aerobic zone, the second mixed liquor having a height in the aerobic zone, wherein the height in the aerobic zone is lower than the height in the aerated anoxic zone;
    statically redirecting a first portion of the second mixed liquor from the aerobic zone to the aerated anoxic zone through an opening at a flow rate of two to four times the influent velocity;
    transferring a second portion of the second mixed liquor from the aerobic zone to a settling zone;
    withdrawing an effluent stream from the settling zone;
    measuring a total nitrogen content of the effluent stream;
    comparing the measured nitrogen content to a target nitrogen content; and
    recycling the effluent stream from the settling zone to the aerobic zone when the measured nitrogen content exceeds the target nitrogen content.

2. The process according to claim 1, wherein the wastewater comprises a nitrogen-containing compound.

3. The process according to claim 1, wherein the wastewater comprises a phosphorous-containing compound.

4. The process according to claim 1, wherein the aerated anoxic zone and the aerobic zone are concentric.

5. The process according to claim 4, wherein the aerated anoxic zone and the aerobic zone are in a racetrack configuration.

6. The process according to claim 4, wherein the aerated anoxic zone and the aerobic zone are in a circular configuration.

7. The process according to claim 1, further comprising providing an oxygen-containing gas to the aerated anoxic zone.

8. The process according to claim 7, wherein the oxygen-containing gas is provided by an aerator.

9. The process according to claim 8, wherein the aerator is a disc aerator.

10. The process according to claim 1 further comprising allowing a third portion of the second mixed liquor to flow into an anaerobic zone and forming a third mixed liquor.

11. The process according to claim 10, further comprising statically redirecting at least a portion of the third mixed liquor to the aerobic zone.

12. The process according to claim 1, further comprising placing a baffle at a predetermined location between the aerated anoxic zone and the aerobic zone.

13. The process according to claim 1, further comprising withdrawing activated sludge from the second mixed liquor to form a settled sludge.

14. The process according to claim 13, further comprising recycling at least a portion of the settled sludge to the aerated anoxic zone.

15. A process for recycling mixed liquor in an oxidation ditch having multiple adjacent moving biological reaction zones, the biological reaction zones sharing a common intermediate chamber wall, wherein the mixed liquor level of an outer aerated anoxic nitrification/denitrification zone is higher than the mixed liquor level of an inner aerobic zone such that the mixed liquor flows from the outer aerated anoxic nitrification/denitrification zone to the inner aerobic zone, the process comprising:
    statically redirecting the flow of the mixed liquor in the aerobic zone to the aerated anoxic nitrification/denitrification zone at a fluid velocity of two to four times an influent flow rate;
    transferring a portion of the mixed liquor from the aerobic zone to a settling zone;
    withdrawing an effluent stream from the settling zone;
    measuring a nitrogen content of the effluent stream; and
    comparing the measured nitrogen content to a target nitrogen content.

16. The process according to claim 15, wherein the aerated anoxic zone and the aerobic zone are concentric.

17. The process according to claim 16, wherein the aerated anoxic zone and the aerobic zone are in a racetrack configuration.

18. The process according to claim 16, wherein the aerated anoxic zone and the aerobic zone are in a circular configuration.

19. The process according to claim 15, further comprising recycling the effluent stream from the settling zone to the aerobic zone when the measured nitrogen content exceeds the target nitrogen content.

* * * * *